United States Patent [19]

Taylor

[11] 4,165,200

[45] Aug. 21, 1979

[54] DRILLING AND DEBURRING APPARATUS

[76] Inventor: Lyle M. Taylor, 523 Lind St., Quincy, Ill. 62301

[21] Appl. No.: 887,028

[22] Filed: Mar. 16, 1978

[51] Int. Cl.² .................... B23B 41/00; B23B 51/08
[52] U.S. Cl. .................... 408/118; 408/37; 408/115 R; 408/191; 408/224
[58] Field of Search .................... 408/22, 26, 31, 36, 408/38, 42, 52, 87, 115 R, 115 B, 118, 119, 117, 191, 193, 194, 211, 224, 225, 37

[56] References Cited

U.S. PATENT DOCUMENTS

| 2,899,851 | 8/1959 | Grobecker | 408/26 |
| 3,063,312 | 11/1962 | Mueller | 408/191 |

FOREIGN PATENT DOCUMENTS 19943 of 1892 United Kingdom .................... 408/191
1401170 7/1975 United Kingdom .................... 408/211

*Primary Examiner*—Leonidas Vlachos
*Attorney, Agent, or Firm*—Grace J. Fishel

[57] ABSTRACT

The burr formed on the breakout side of a workpiece during a drilling operation is removed by a deburring bit positioned underneath the workpiece in axial alignment with the drill bit. The drill bit is of the twist type and has at least two longitudinal flutes joined by a web and separated by an equal number of longitudinal lands. The deburring bit has a number of radially extending cutting elements which project radially outwardly from adjacent the bottom of each flute to substantially beyond the diameter of the hole. At the bottom of the flutes, the radially extending cutting elements are spaced to pass the web of the drill bit axially therebetween and to engage the flutes when the drill bit is rotated.

9 Claims, 4 Drawing Figures

DRILLING AND DEBURRING APPARATUS

The present invention relates to an apparatus which, in a single operation, drills a workpiece and immediately deburrs it.

Burrs are frequently formed when a drill bit passes through a metal workpiece. It is the usual practice to deburr the workpiece in a separate operation. For this purpose, the drill bit can be replaced with a deburring bit or the workpiece can be moved to a separate drill already outfitted with a deburring tool. Typical deburring tools are described in U.S. Pat. Nos. 2,829,543, 2,829,544, 3,076,254 and 4,032,251.

Whether the workpiece is deburred at the same work station where it is drilled or not, the workpiece must be inverted before it is deburred. This handling contributes to the expense of deburring since it requires the attention of an operator and may also require special equipment for lifting the piece.

In order to avoid such handling and deburr the workpiece at the time it is drilled, modified twist drills have been proposed. Drills of this type have included recessed burr cutters in the drill shank such that the cutters expand outwardly and cut off the burr after the bit has passed through the workpiece, e.g. U.S. Pat. Nos. 2,372,719, 2,437,822 and 3,940,214. One common problem with these bits is that the shank is weakened by the recesses for the burr cutters. Furthermore, the bits sometimes fail to perform properly when metal chips jam into the recesses and impede the outward movement of the spring biased cutters.

Among the several objects of the present invention may be noted the provision of an apparatus which drills a workpiece and immediately deburrs it and which does not become jammed with metal chips. Another object, depending on the configuration of the deburring bit, is to provide an apparatus which not only drills and deburrs the workpiece but also chamfers, countersinks or counterbores the hole as well. Other objects and features will be in part apparent and in part pointed out hereinafter.

The invention accordingly comprises the constructions hereinafter described, the scope of the invention being indicated in the subjoined claims.

In the accompanying drawings, in which one of various possible embodiments of the invention is illustrated, corresponding reference characters refer to corresponding parts throughout the several views of the drawings, wherein.

Figure 1:
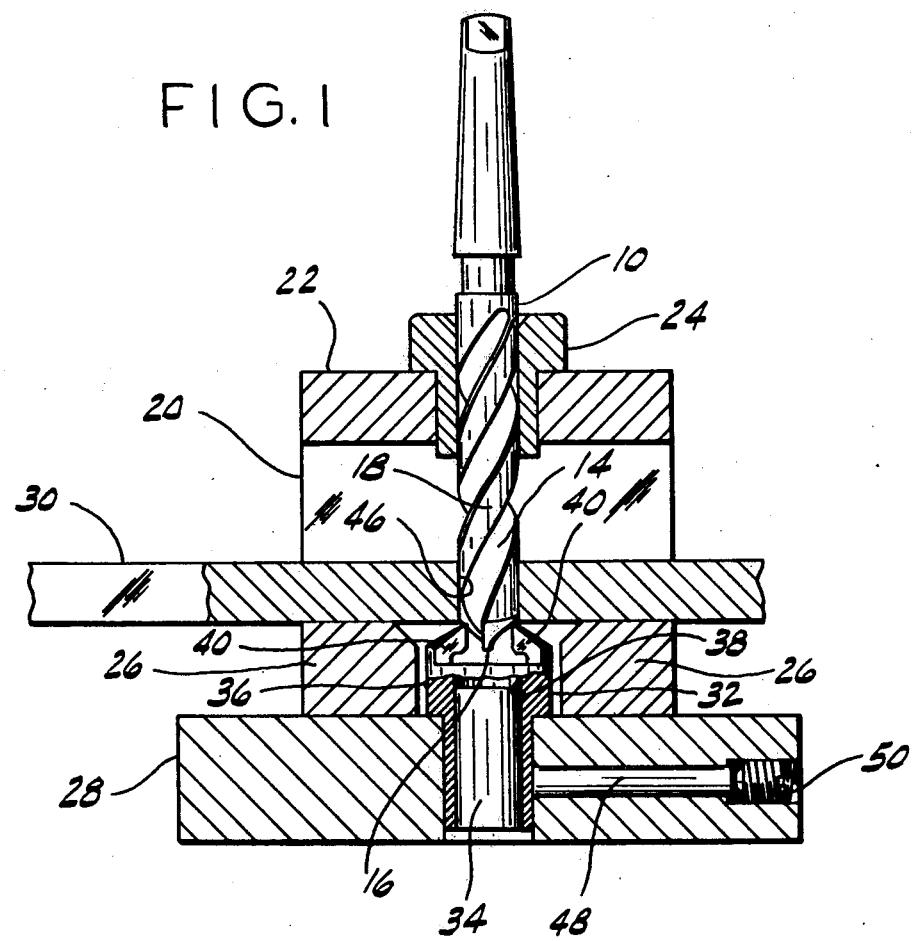
FIG. 1 is a vertical cross-sectional view of an apparatus in accordance with the present invention.
Figure 3:
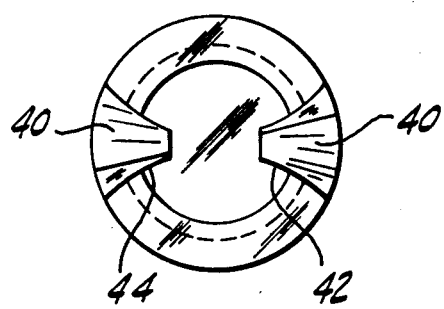
FIG. 3 is a top plan view of the deburring bit shown in FIG. 2 and taken along line 3—3; and, FIG. 4 is a bottom plan view of the twist drill bit shown in FIG. 2 and taken along line 4—4.

Referring to the drawings more particularly by reference character, reference numeral 10 refers to a drill bit of the twist type with a cylindrical body extending from an extreme cutting end 12 to the commencement of a shank. As shown, bit 10 is of the twist type and includes at least two longitudinal flutes 14 joined by a web 16 and separated by an equal number of longitudinal lands 18. The chisel edge of point 12 is thinned at 19 by appropriately grinding down lands 18.

Bit 10 is mounted in a drill fixture 20 which includes an upper support plate 22 for mounting the bit in a drill guide bushing 24. Locating pads 26 rest on a base plate 28 and support a workpiece 30.

As shown in FIG. 1, deburring bit 32 is mounted on an integral shaft 34 which is journaled in base plate 28. So mounted, deburring bit 32 is positioned below and in axial alignment with twist drill bit 10 but opposed thereto.

For orientation purposes, the term upwardly as used hereinbelow indicates the longitudinal direction towards upper support plate 22, while the term downwardly expresses the opposite longitudinal direction towards base plate 28. The term outwardly is used to indicate the direction radially outwardly or away from the longitudinal axis of twist drill bit 10 or deburring bit 32, said axes being in alignment as aforementioned.

Figure 2:
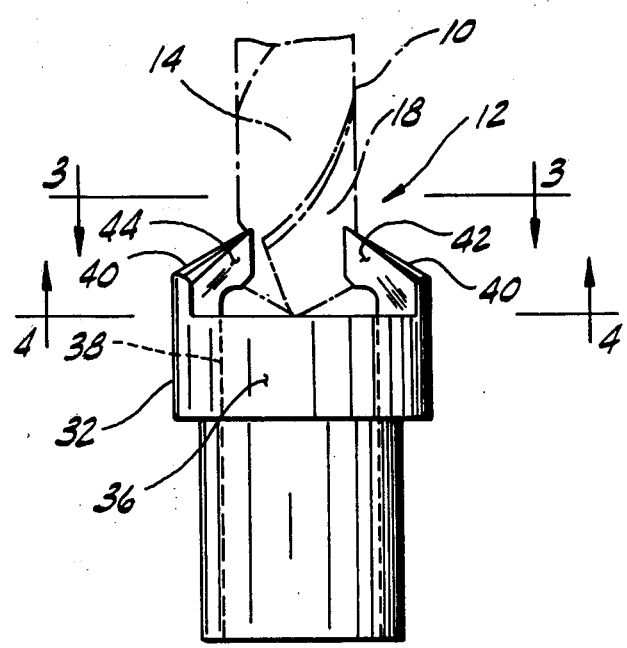
FIG. 2 is a side elevational view showing a deburring bit in full lines and the tip of a twist drill bit in broken lines.
Figure 4:
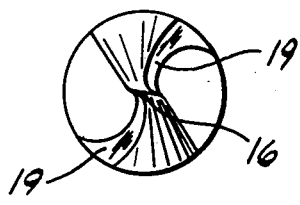

Deburring bit 32 includes a cylindrical body 36 with a central axial bore 38 therethrough. Projecting upwardly from body 36 are cutting elements 40. Elements 40, as shown, are identical and are positioned in alignment with flutes 14. Elements 40 are spaced to pass web 16 of twist drill bit 10 axially therebetween and to engage flutes 14 opposite the cutting face of the flute when the twist drill bit is rotated. As shown, each of elements 40 project radially outwardly from adjacent the bottom of the adjacent flute to substantially beyond the diameter of the twist drill bit when the bit is received therebetween. The width of elements 40 at the periphery of body 36 is selected substantially the same as the width of flutes 14 but such that elements 40 can be received therein. As best seen in FIG. 2, when deburring bit 32 is rotated clockwise, edge 42 provides a cutting edge while edge 44 provides a lagging or non-cutting edge. Edge 44, as shown, is chamfered for relief.

Still with reference to FIG. 2, elements 40 project upwardly at an angle. This angle is preferably the same angle as the point of twist drill bit 10 and governs the depth that the deburred hole is chamfered. The point angle of the twist drill bit depends primarily on the nature of the metal being drilled. Whatever angle is selected, it is preferred as aforesaid that elements 40 be formed at the same angle as the drill point.

In use, workpiece 30 is positioned on locating pads 26 in the drilling and deburring apparatus of the present invention below twist drill bit 10 and above deburring bit 32. As shown in FIG. 1, a hole is drilled in workpiece 30 in the usual manner. As twist drill bit 10 passes through the workpiece, tip 12 passes between elements 40 thus engaging deburring bit 32. As bit 10 continues to rotate, deburring bit 32 rises along flutes 14 into cutting contact with the burred surface of workpiece 30.

As shown, locating pads 26 support workpiece 30 just above upwardly extending cutting elements 40. Accordingly, the deburring bit is picked up by the twist drill bit as soon as the bit has penetrated the workpiece. For this purpose, axial bore 38 must be deep enough so that deburring bit 32 can rise vertically along the flutes into contact with the burred surface. As shown in FIG. 2, bore 38 is completely through shaft 34. If it is desired to counterbore the hole, elements 40 can be provided with horizontal cutting edges.

If it is desired to cut a deeper chamfer than shown in FIG. 1, this can be accomplished by increasing the resistance of deburring bit 32 to rotation. For this purpose, one end of a rod 48 is pressed against shaft 34 by means of set screw 50. As long as the deburring bit is free to rotate, the greater the resistance applied to shaft 34, the deeper will be the cut made by the deburring bit. Alternatively, resilient biasing means or the like can be used to effect upward movement of the deburring bit into contact with the workpiece.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A drilling and deburring apparatus including means for supporting a workpiece below a twist drill bit and above a deburring bit, said twist drill bit and said deburring bit axially aligned in opposition and rotatably mounted in said support means, said twist drill bit including at least two longitudinal flutes joined by a web and separated by an equal number of longitudinal lands, said deburring bit including at least two radially extending cutting means which are spaced to pass the web of the twist drill bit axially therebetween and to engage the flutes of the twist drill bit when the twist drill bit is rotated, each of said cutting means projecting radially outwardly from adjacent the bottom of the adjacent flute to substantially beyond the diameter of the twist drill bit.

2. The apparatus according to claim 1 including means for adjusting resistance to rotation on the deburring bit.

3. The apparatus according to claim 1 wherein the cutting means are formed at substantially the same angle as the point of the twist drill bit.

4. A drilling and deburring apparatus including means for supporting a workpiece below a twist drill bit and above a deburring bit, said twist drill bit and said deburring bit axially aligned in opposition and rotatably mounted in said support means, said twist drill bit including at least two longitudinal flutes joined by a web and separated by an equal number of longitudinal lands, said deburring bit including a cylindrical body with an axial bore therethrough having a diameter substantially larger than the diameter of the twist drill bit, said cylindrical body including means for mounting the deburring bit in said support means, said deburring bit further including at least two equally spaced and radially extending cutting elements integrally formed with the cylindrical body and spaced to pass the web of the twist drill bit axially therebetween and to engage the flutes of the twist drill bit when the twist drill bit is rotated, each of said cutting elements projecting radially outwardly from adjacent the bottom of the adjacent flute to substantially beyond the diameter of the twist drill bit.

5. The apparatus according to claim 4 wherein the twist drill bit has two longitudinal flutes and two longitudinal lands.

6. The apparatus according to claim 5 wherein the deburring bit has two diametrically opposed cutting elements.

7. The apparatus according to claim 6 wherein the cutting elements are formed at substantially the same angle as the point of the twist drill bit.

8. The apparatus according to claim 7 having an adjustable friction means bearing against said means for mounting the deburring bit in the support means for adjusting the resistance of the deburring bit to rotation.

9. The apparatus according to claim 7 wherein the cutting elements include a horizontal cutting edge.

* * * * *